United States Patent
Sinha et al.

(10) Patent No.: US 8,103,997 B2
(45) Date of Patent: Jan. 24, 2012

(54) METHOD OF EMPLOYING SLEW DEPENDENT PIN CAPACITANCES TO CAPTURE INTERCONNECT PARASITICS DURING TIMING ABSTRACTION OF VLSI CIRCUITS

(75) Inventors: Debjit Sinha, Wappingers Falls, NY (US); Soroush Abbaspour, Ossining, NY (US); Adil Bhanji, Wappingers Falls, NY (US); Jeffrey M. Ritzinger, Chippewa Falls, WI (US)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 12/426,492

(22) Filed: Apr. 20, 2009

(65) Prior Publication Data
US 2010/0269083 A1  Oct. 21, 2010

(51) Int. Cl.
*G06F 17/50* (2006.01)
(52) U.S. Cl. .................................. 716/100
(58) Field of Classification Search .............. 716/100
See application file for complete search history.

(56) References Cited

U.S. PATENT DOCUMENTS

| | | | |
|---|---|---|---|
| 6,158,022 A | 12/2000 | Avidan | |
| 6,581,197 B1 | 6/2003 | Foutz et al. | |
| 6,604,227 B1 | 8/2003 | Foltin et al. | |
| 6,609,233 B1 | 8/2003 | Foltin et al. | |
| 6,925,623 B2 * | 8/2005 | Roethig | 716/115 |
| 6,996,515 B1 | 2/2006 | Foltin et al. | |
| 7,036,100 B2 | 4/2006 | Tyler et al. | |
| 7,454,719 B2 * | 11/2008 | Roethig | 716/113 |
| 7,464,349 B1 * | 12/2008 | Keller et al. | 716/136 |
| 7,594,209 B2 * | 9/2009 | Abbaspour et al. | 716/108 |
| 7,788,617 B2 * | 8/2010 | Bhanji et al. | 716/113 |
| 2005/0060674 A1 * | 3/2005 | Roethig | 716/5 |
| 2005/0268262 A1 * | 12/2005 | Roethig | 716/5 |
| 2007/0143723 A1 * | 6/2007 | Kawakami | 716/6 |
| 2008/0243414 A1 * | 10/2008 | Oh et al. | 702/85 |
| 2008/0270960 A1 * | 10/2008 | Abbaspour et al. | 716/6 |
| 2009/0228850 A1 * | 9/2009 | Bhanji et al. | 716/6 |

* cited by examiner

*Primary Examiner* — Suchin Parihar
(74) *Attorney, Agent, or Firm* — H. Daniel Schnurmann

(57) ABSTRACT

A method for converting interconnect parasitics of an interconnect network into slew dependent pin capacitances utilizes charge matching between predetermined voltage thresholds. During timing abstraction of a macro, parasitics of interconnects connected to the primary inputs are represented as slew dependent pin capacitances in an abstract model being created. Interconnect model order reduction is employed to speed the process. The generated abstract is subsequently used in place of each occurrence of the macro during chip level hierarchical static timing analysis, leading to an enhanced accuracy of the timing analysis of the logic components driving the abstracts.

21 Claims, 7 Drawing Sheets

METHOD OF EMPLOYING SLEW DEPENDENT PIN CAPACITANCES TO CAPTURE INTERCONNECT PARASITICS DURING TIMING ABSTRACTION OF VLSI CIRCUITS

FIELD OF THE INVENTION

The invention generally relates to the field of Design Automation, and more particularly, to the method of modeling interconnect parasitics as slew dependent pin capacitances during timing abstraction of Very Large Scale Integrated (VLSI) circuits.

BACKGROUND OF THE INVENTION

Static Timing Analysis (STA) is a key step in the design of high speed Very Large Scale Integrated (VLSI) circuits. It is used to verify that a given VLSI circuit design performs correctly at a required frequency before it is released to manufacturing. STA is performed on a timing graph representation of the design; the points in the design where timing information is desired constitute the nodes or timing points of the graph, while electrical or logic connections between nodes are represented by timing arcs of the graph. STA typically consists of certain fundamental steps that include:
  i) delay calculations, which involves modeling and calculating delays across the gates and interconnects (represented by timing arcs) included in the timing graph representation of the design;
  ii) propagation and calculation of signal arrival times, required arrival times and slews across all timing points, and
  iii) slack calculation across all timing points in the design.

Referring to FIG. 1, there is shown an illustrative circuit 100 having a primary input port 102 and a primary output port 109. An interconnect 103 (also referred to as a net) connects the primary input to gate 105. The input pin capacitance of the gate 105 is labeled with numeral 104. Gate 105 feeds logic 106 that includes other gates and nets, and finally connects to gate 107. The net 108 connects gate 107 to the primary output that has an external capacitive load $C_L$.

An interconnect network denotes a set of connected interconnect (or wire) segments that are driven by at least one source pin and feeds at least one sink pin. Typically, there is only a single source pin of the interconnect network, while multiple sink pins are common. A source pin is often connected to the output of a gate or a primary input, while a sink pin is likely connected to the input of a gate or a primary output. The electrical parasitics of the mentioned set of interconnect segments excluding the source and sink gate or primary input/output pin capacitances constitute the parasitics of the corresponding interconnect network. Referring to FIG. 1, the interconnect network connected to the primary input 102 is composed of the interconnect segment 103.

When performing an STA on the illustrative circuit 100, computing voltage waveforms (which may be represented by delays and slews) across all gates and nets in the design are necessitated. Given a voltage waveform 101 at the primary input 102, the voltage waveform at the sink of the interconnect 103 is a function of the voltage waveform 101, the interconnect parasitics 110 and the input pin capacitance 104 of gate 105. The voltage waveform at the sink of 103 is calculated by fitting a ramp or a piece-wise-linear waveform to the voltage waveform 101 at the primary input, and subsequently convolving it with the transfer function of the interconnect load. Various Model Order Reduction (MOR) techniques such as Asymptotic Waveform Evaluation (AWE) and Passive Reduced-order Interconnect Macromodeling Algorithm (PRIMA) have been proposed for accurate interconnect timing analysis. The stated techniques reduce the complexity of a large-scale interconnect network to a smaller portion thereof, while preserving, to the possible extent, their input-output behavior. Alternatively, a large-scale interconnect network is approximated or reduced to a smaller interconnect network so that when the same input signal is applied to the output response of the original and the approximated (reduced) network, they closely match each other.

Higher order reduced models offer increased accuracy at the cost of increasing the complexity of the analysis. By way of example, a first reduced order model can be analyzed very rapidly, but it may introduce significant errors in the input-output behavior of the system. Consequently, a trade-off between accuracy and speed for determining the order of the reduced model is performed. In the simplest case, the interconnect parasitics 110 and the input pin capacitance 104 of gate 105 may be approximated by a single capacitive load or lumped load, which may be obtained by summing the capacitances in 110 and the input pin capacitance 104. However, such a lumped load model can introduce significant errors in the delay and slew calculations while performing a static timing analysis.

With modern chip manufacturing technology scaling to sub-65 nanometers, VLSI designs are increasingly getting larger in terms of size and complexity. Performance centric designs, especially microprocessor designs, include custom circuit designed components called macros to achieve aggressive frequency targets. STA of these macros utilize circuit simulators to simulate the device delay and slew calculations.

It is known in the art that Application Specific Integrated Circuit (ASIC) designs include several million gates while typical microprocessor designs may include upwards to one billion transistors. Circuit simulation, while highly accurate for transistor level designs, is run-time intensive. Accordingly, it is not practical to use in a timing flow where timing runs are made daily during the design cycle of the chip. In essence, a static timing analysis of such large circuits configured as a single flattened design is run-time prohibitive. The has led to the development of a hierarchical timing flow where custom parts of the design are timed using accurate timing models (e.g., transistor level timing tools with circuit simulation type accuracy in the case of microprocessor designs), followed by the generation of timing abstract models that reflect in a simpler form, the actual timing characteristic of the custom logic. The latter step is termed timing abstraction, and may be employed for non custom logic designs as well. For ease of notation in the present invention, the term macro will be used to denote any circuit being abstracted, irrespective of the true level of hierarchy of that circuit. A macro may represent a transistor level design, consisting of Field Effect Transistor (FET) devices and interconnects, or a gate level design, consisting of gates and interconnects. Inputs and outputs of the macro are denoted as macro primary inputs and macro primary outputs, respectively. At the next (upper) level of hierarchy (termed chip level for ease of notation), macros are generally represented by abstracts. Multiple levels of hierarchy are common in modern VLSI designs. The term chip level will be generically used to denote a level of hierarchy where an abstract (generated at a lower level of hierarchy) is being included for STA.

Referring to FIG. 2, a hierarchical microprocessor 200 chip design is shown at the chip level of the hierarchy that includes multiple macros 201. Each macro internal to block 200 is not necessarily unique. Multiple instances of the same macro often exist at upper levels of the hierarchy. Global wires and gates (termed glue-logic, e.g., 202) connect to one or more macros within the chip level, as well as to the primary inputs and primary outputs at the chip level. Each unique macro is separately timed and abstracted and, subsequently, the abstract model is used during static timing analysis as a timing model of the corresponding macro at the chip level.

The hierarchical timing approach enables fast timing analysis and productivity at chip level, since abstract models are simpler (thereby facilitating fast delay and/or slew computation) and allow re-use. These benefits are significantly highlighted when multiple instances of a macro appear at the chip level since the flow avoids expensive separate static timing analysis for each instance of the macro by limiting accurate STA and abstraction only once per unique macro.

A generated abstract captures the timing characteristic of the macro using slew and load dependent tables to model the timing behavior of the logic. The abstract model is required to be context-independent, that is, independent of the voltage waveforms (slews) at its primary inputs and loads at its primary outputs. Consequently, delays and output slews (or waveforms) of timing arcs near the primary inputs (PI) of the macro are characterized as functions of input slew, while delays and output-slews of arcs closer to the macro primary outputs (PO) are characterized as functions of output load, and sometimes a combination of both. This allows the generated abstract models to be used in multiple boundary condition (PI and PO) settings. Timing abstraction employs techniques directed to reducing the size of the timing graph by performing pruning as well as arc compression. These techniques can reduce the number of timing arcs to be timed at the next level of hierarchy significantly. Model reductions of 75% are common. The abstract model essentially represents the macro as a complex gate, and may obfuscate the internal details of the circuit. The may be desirable for generating designs shared between vendors, and provides motivation for generation of abstracts as industry standard gate models.

Referring to FIG. 3, abstraction of the circuit (or macro) in FIG. 1 is illustrated. Block 300 shows the input side of the macro consisting of macro primary input port 301 and an interconnect segment 302 connecting 301 to gate 304. The parasitics of the interconnect segment 302 are referenced by numeral 305, while the input pin capacitance of the gate 304 is labeled as 303. The timing abstract model of the macro is shown as block 306. The macro primary input port 301 is preserved in the abstract model as 307. However, the internal segments and components of the macro (for instance 302 and 304) are abstracted and may even be merged. Block 306 is considered as a complex gate that no longer includes interconnects. The timing arcs in the abstract model are characterized (some as functions of input slew, or output load or both), and the timing model is stored preferably in a standard industry format (e.g., Lib© format). To capture the load seen from the primary input, the total capacitive load of the interconnect segment 302 and the input pin capacitance 303 of gate 304 are summed and set as the lumped pin capacitance 308 on the input port 307 of the abstract model.

Lumped pin capacitances are stored only for the primary input pins of the abstract. This because any glue logic feeding (or driving) the abstract model at the chip level requires the load seen from the primary input of the macro during timing analysis of the glue logic. Since all internal interconnect segments (that are not directly connected to a primary input) in the given macro are characterized and are not fed by any glue logic during hierarchical timing, it is not necessary for the abstract model to store the respective parasitic information.

The delay and output slew across interconnect segment 302 in FIG. 3 is characterized accurately as a function of different voltage waveforms (range of input slews) at the primary input during abstraction. The characterization takes into account the detailed parasitics 305 of the interconnect segment, and is thus accurate. Interconnect segments that are connected to the primary outputs of a macro and gate segments that feed these interconnect segments in the macro are both characterized accurately taking into account the detailed interconnect parasitics. Since no glue logic is expected to feed these segments during hierarchical timing, a lumped pin capacitance to capture the parasitics for these interconnect segments is typically not required.

OBJECTS AND SUMMARY

Accordingly, it is an object of the present invention to provide a method and a system for performing an accurate hierarchic static timing analysis of a VLSI circuit at chip level.

It is another object to provide a method and a system for generating a timing abstract of a macro while capturing the interconnect parasitics connected to the macro primary inputs as slew dependent pin capacitances in the abstract.

It is still another object to generate the abstract as an industry standard gate model without sacrificing accuracy that may be lost when the interconnect parasitics are captured as lumped pin capacitances.

It is yet another object to provide a method for representing interconnect RC or RLC parasitics as a slew dependent pin capacitance.

It is a further object to combine an interconnect RC or RLC network with slew and/or load dependent pin capacitances at its sinks to obtain a combined RC or RLC network, and subsequently representing the combined network as a slew dependent pin capacitance.

These and other objects, aspects and advantages of the invention are achieved by a method and a system for representing the parasitics of an interconnect network as a slew dependent pin capacitance, wherein charge matching between predetermined voltage thresholds is employed. During timing abstraction of a macro, parasitics of interconnects connected to the macro primary inputs are represented as slew dependent pin capacitances in the generated abstract model. Interconnect model order reduction can be advantageously used to speed-up the process. The generated abstract is subsequently used in place of each instance of the macro during chip level hierarchical static timing analysis, thereby facilitating accurate timing analysis for logic components driving the abstracts.

In one aspect of the invention, there is provided a method and a system for improving the accuracy of an integrated circuit (IC) macro's abstract model by converting parasitics of at least one interconnect network in the macro into a slew dependent pin capacitance, given a set of waveforms corresponding to predetermined slews, the method including: a) determining sink pin capacitances of the interconnect network; b) merging the sink pin capacitances with the parasitics of the interconnect network; c) determining effective capacitances for the merged parasitics corresponding to the voltage waveforms at a source of the merged interconnect network; d) modeling the effective capacitances as a slew dependent pin capacitance associated with the source; and e) modifying the abstract model by applying the slew dependent pin capacitance to the abstract model.

BRIEF DESCRIPTION OF THE DRAWINGS

The accompanying drawings, which are incorporated in and which constitute part of the specification, illustrate the presently preferred embodiments of the invention which, together with the general description given above and the detailed description of the preferred embodiments given below serve to explain the principles of the invention.

DETAILED DESCRIPTION

The present invention and the various features and advantageous details thereof are explained more fully with reference to the non-limiting embodiments that are illustrated in the accompanying drawings and detailed in the following description of an embodiment of the invention.

Typically, abstract models capture the Resistance Capacitance (RC) or Resistance Inductance Capacitance (RLC) parasitics of interconnect networks connected to primary inputs of a macro along with the input pin capacitances of gates fed by the interconnect networks as lumped pin capacitances on the primary inputs. A gate driving such an abstract model during hierarchical chip level STA may incur inaccuracies in delay and slew calculation since it observes a lumped load instead of the real RC or RLC interconnect network. These inaccuracies become significant when the interconnect network connected to the primary input of the abstracted macro is resistive.

Figure 1:
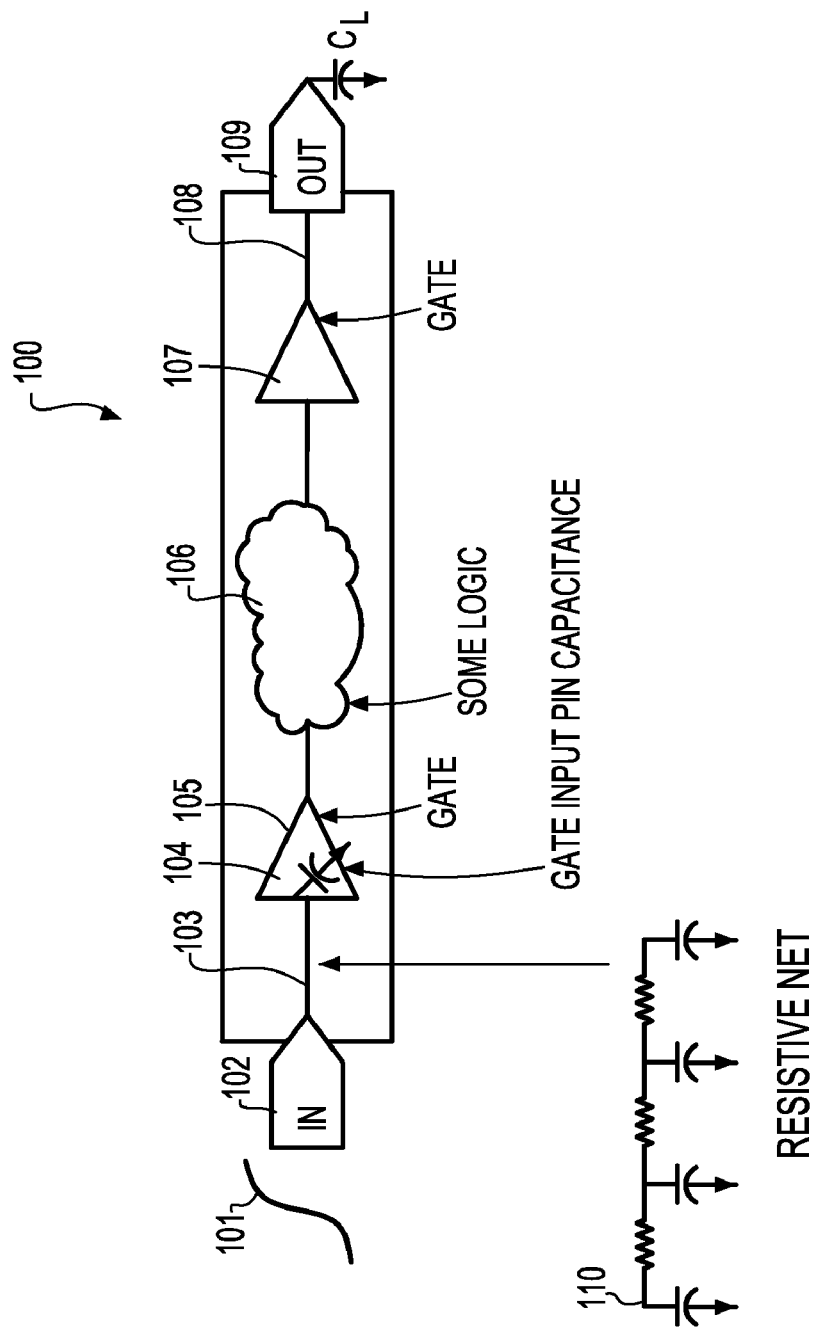
FIG. 1 shows a macro including a resistive interconnect network connected to the primary input of the macro.
Figure 2:
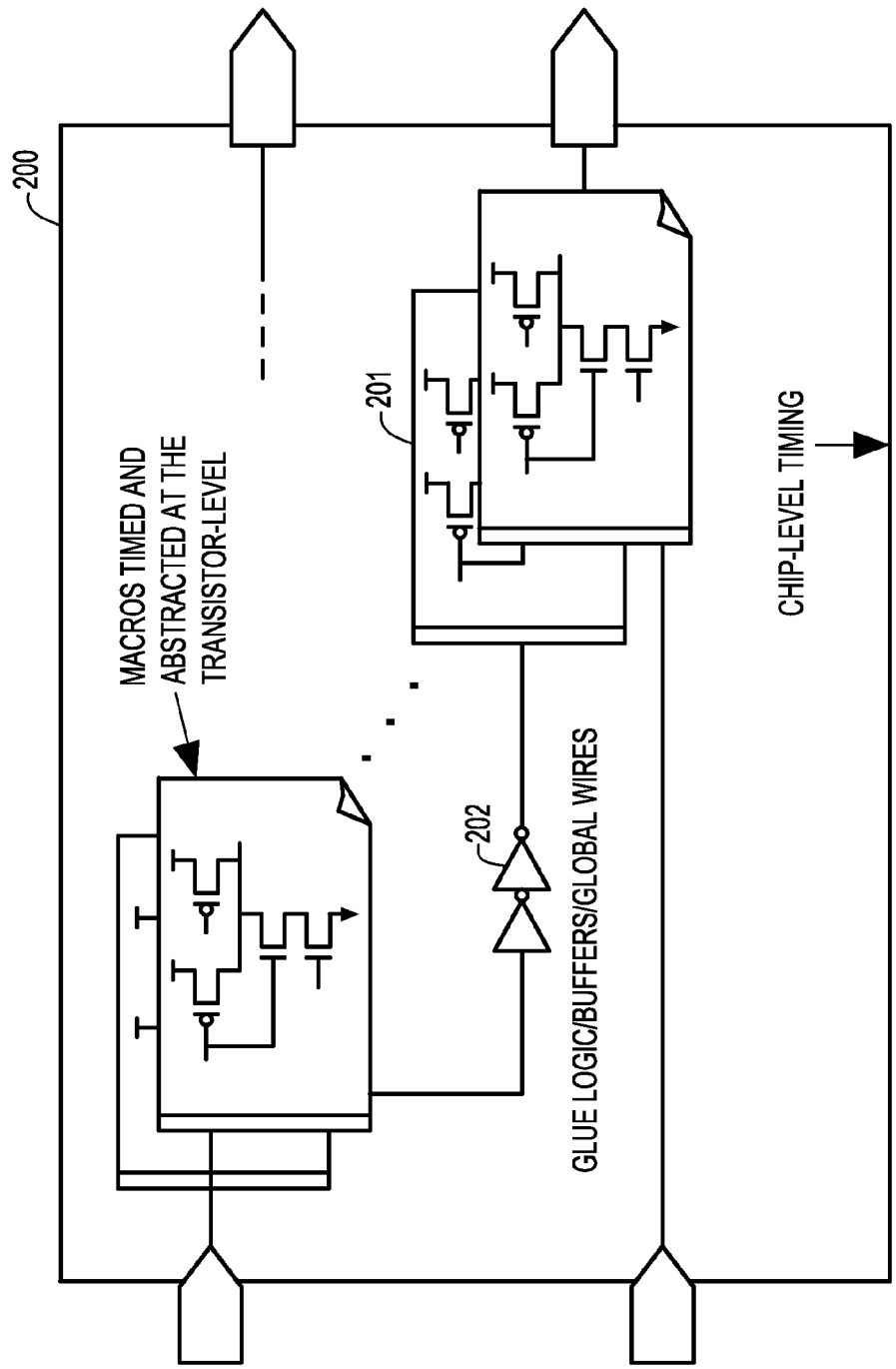
FIG. 2 shows a hierarchical design at chip level including multiple macros connected to each other and to the primary inputs and outputs via glue logic.
Figure 3:
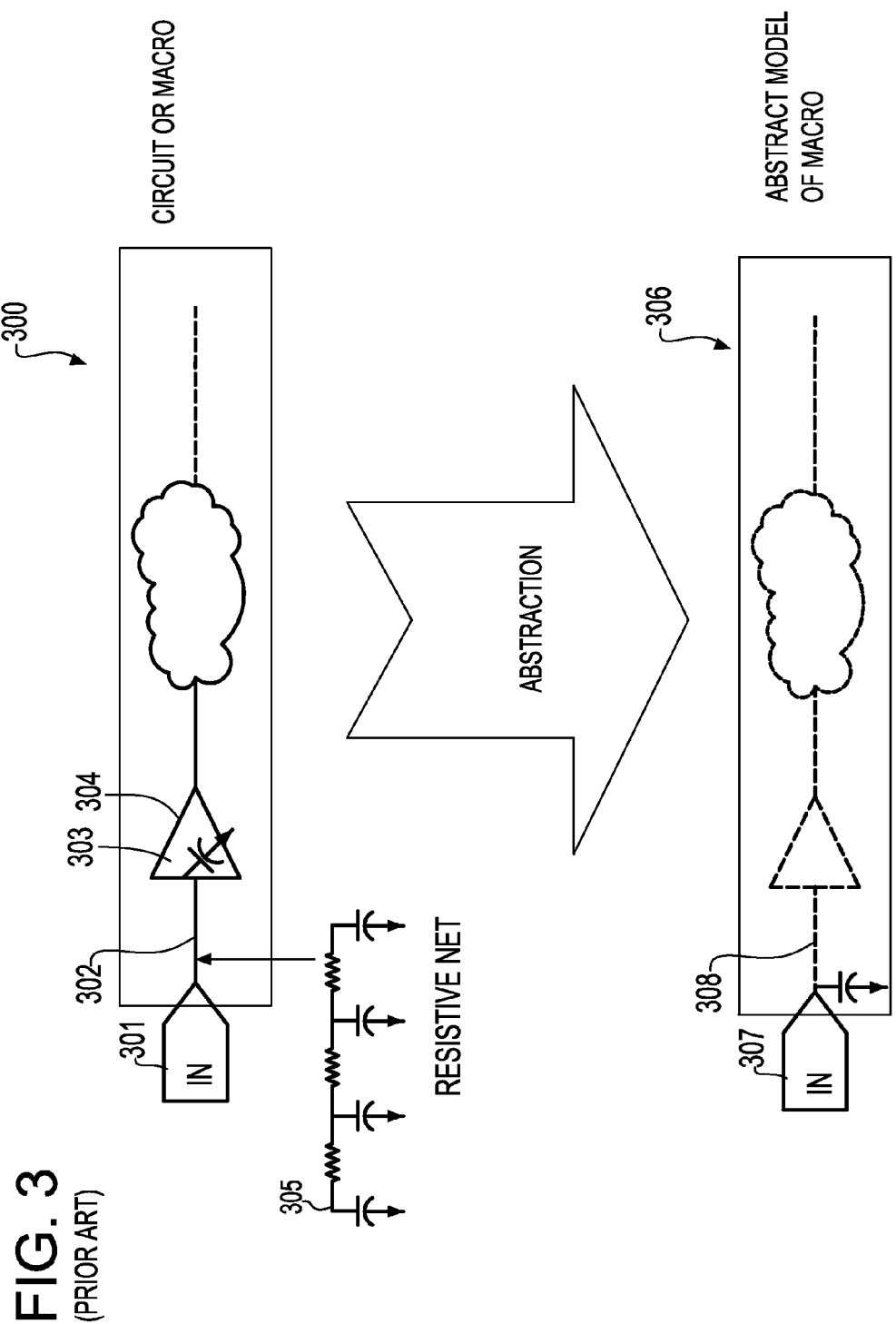
FIG. 3 illustrates the generation of an abstract model for a given macro.
Figure 4:
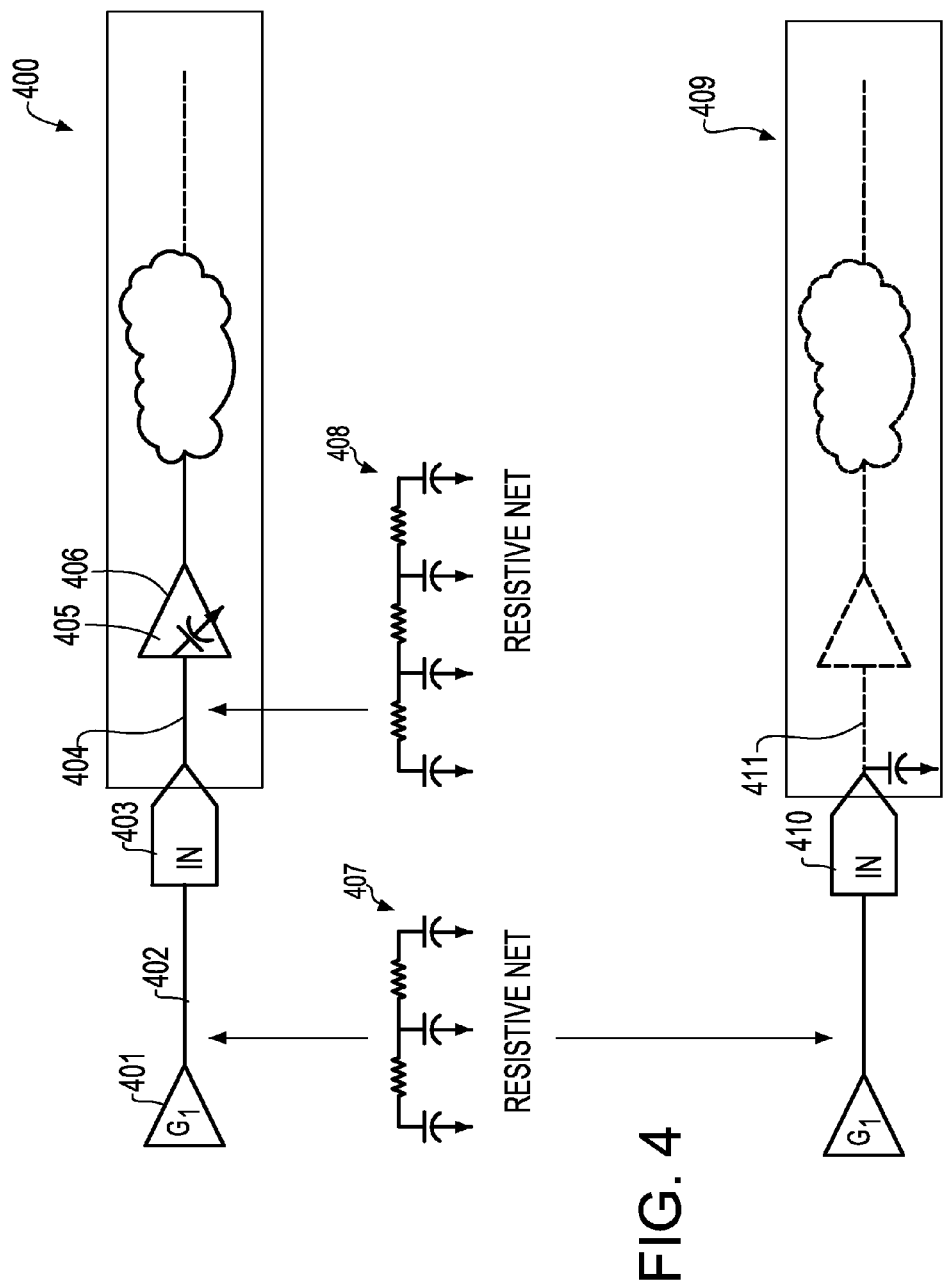
FIG. 4 illustrates differences between a gate driving a macro versus an instance where the same gate drives an abstract model of the macro to highlight potential sources of inaccuracies during a hierarchical static timing analysis.

FIG. 4 illustrates the cause of the above inaccuracies in the timing analysis illustrated by way of an example. In the figure, there is shown a gate $G_1$ (labeled as 401) driving a macro 400, which is compared to the scenario where the same gate drives a conventional abstract model 409 of the same macro 400. In each case, the gate $G_1$ drives the macro or the abstract model via an interconnect segment 402.

In the former case, gate $G_1$ drives a hierarchical interconnect network that consists of interconnect segments 402 and 404, and the input pin capacitance 405 of gate 406 within macro 400. The parasitics of the combined network consists of parasitics 407, 408, and pin capacitance 405. For a delay and output slew calculation of $G_1$, a model order reduction may be performed on the combined hierarchical interconnect network to obtain a reduced (e.g. RCπ) interconnect model. Effective capacitance techniques are subsequently employed given the reduced model and the slew at the input of $G_1$ to obtain an accurate delay and output slew across $G_1$.

In the latter case, $G_1$ drives the abstract model 409 via the interconnect segment 402. The interconnect network that $G_1$ drives is shown to consist of parasitics 407 and primary input pin capacitance 411. The network is different from the hierarchical interconnect network that $G_1$ drives in the former case since details (parasitics) of the network 404 are approximated to a lumped load 411 during abstraction. Consequently, the reduced model obtained in the case after a model order reduction is different and causes inaccuracies during timing analysis across $G_1$.

The resulting inaccuracies are further manifested during timing analysis of the interconnect segment 402. In the former case, interconnect timing analysis techniques (e.g. RICE©) are employed for the complete hierarchical interconnect network consisting of segments 402 and 404, and pin capacitance 405, with a timing query at port 403. However, in the latter case, the interconnect analysis is performed only for segment 402 which now feeds a lumped load 411 instead of an RC or RLC load 408 combined with 405.

As a result, the voltage waveform (signal arrival time and slew) computed in the two cases at primary input ports 403 and 410, respectively, may differ from one another. Any inaccuracy in the slew at port 410 propagates downstream since the slew is used in the abstract model to compute the delays and slews across the timing arcs within the abstract model. The significance of these inaccuracies grows when the interconnect segment 404 becomes increasingly resistive. If the segment is not resistive, the combined parasitic of the segment 408 having the pin capacitance 405 becomes a simple lumped load identical to 411. In this case, the voltage waveforms obtained at the primary input ports 403 and 410 are, likewise also identical. However, in current sub-65 nanometer VLSI designs, long global interconnects often connect primary inputs to gates within the macro. These interconnect networks are prone to be highly resistive, and are thus subject to the previously mentioned inaccuracies during a hierarchical STA.

An alternate approach to prevent timing inaccuracies is to avoid storing lumped input pin capacitances at input ports of the abstract models. Instead, the interconnect networks connected to the primary inputs and outputs of the macro are not abstracted and their parasitics are preserved as they stand. An abstract model in this case consists of a gate model for the macro that does not include abstracted interconnect segments connected to the primary inputs and outputs of the macro, and a set of interconnect networks that connect the abstracted gate model to its primary input and output ports.

During chip level timing, a gate driving an abstract model sees the hierarchical interconnect network correctly, and therefore does not normally incur in timing inaccuracies. However, the method of abstraction has the following disadvantages:

The abstract is no longer a simple gate model, and includes a set of interconnect networks. As a result, the abstract cannot be represented as an industry standard gate model (e.g. .Lib©). This is undesirable in terms of sharing proprietary information between VLSI design vendors.

There is an increase in run-time during a hierarchical STA at the chip level since now a timing analysis of the interconnect networks in the abstract needs to be performed additionally. This is typically slower than a table-lookup based timing analysis of conventional abstracts.

The present invention overcomes these problems by capturing the parasitics of interconnects connected to the primary inputs of a macro as slew dependent pin capacitances during abstraction. Recent industry standard gate models (e.g. ECSM© and CCS©) no longer limit gate input pin capacitances to constant values since the gate input pin impedance may vary during a voltage transition at the gate input. In addition, the input pin capacitance value is dependent on the loading condition at the output pin of that gate due to Miller effects. Current industry standard gate current-source models offer two ways of modeling gate input pin capacitances: (1) the Effective Current Source Model (ECSM©) format which models the input pin capacitance as a function of slew and output capacitive load, and (2) the Composite Current Source (CCS©) format that employs a two-piece pin capacitance model for each input slew/output capacitance combination. Both these models are table-based representations. It is to be noted that the industry standard modeling of slew dependent pin capacitances is aimed at capturing input pin impedances of Complementary Metal Oxide Semiconductor (CMOS) gates accurately due to Miller effects and not at capturing interconnect parasitics.

Figure 5:
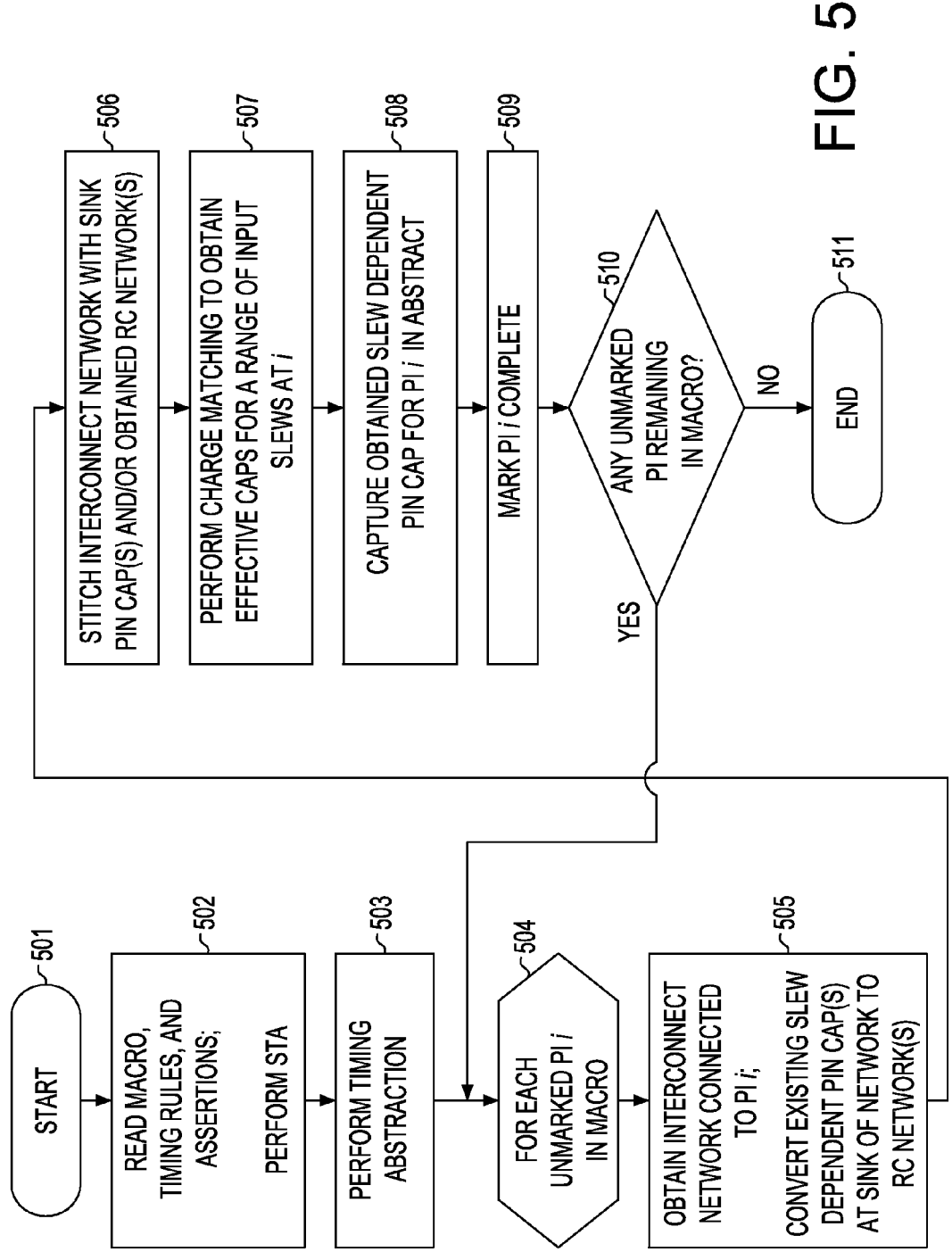
FIG. 5 is a flow-chart illustrating steps for generating an abstract model of a given macro and modeling the primary input pin capacitances of the abstract as slew dependent pin capacitances.

FIG. 5 is a flow diagram illustrating one embodiment of a method (labeled 500) for generating a timing abstract model of a given macro that captures the parasitics of interconnects connected to the primary inputs of the macro as slew dependent pin capacitances in the abstract model. The method 500 is initialized in step 501. In step 502, the macro is read in along with the timing models for the macro and timing assertions. The macro may be a gate level design with industry standard timing models like Liberty© or ECSM©, or may be a transistor level design which requires a circuit simulator to obtain delay and slew (or waveform) information during timing analysis. Static timing analysis of the macro is subsequently performed wherein timing quantities, such as delays and slews are computed and propagated throughout the timing graph to obtain arrival times at the primary outputs. Required arrival times are propagated in a conventional manner and slacks are obtained at desired timing points in the timing graph. The step may include conventional static timing analysis components like coupling analysis, common path pessimism reduction, and report generation.

In step 503, a timing abstraction of the macro is performed. Abstract models to be generated are specified to be either complete abstracts or boundary abstracts. For complete abstracts, no pruning of the timing graph is performed and an abstract is generated for the complete timing graph. However, for boundary abstracts, internal latch-to-latch paths in the timing graph are pruned. Timings arcs between primary inputs to the first latch input boundaries, and those between latch outputs to the primary outputs are retained in the type of abstraction. The latter model assumes that timing requirements for the internal latch-to-latch paths would be satisfied by a macro designer before the abstract is released for hierarchical timing at the chip level, where the timing for only the boundary paths need to be verified. The boundary abstract model size is therefore smaller than that of a complete abstract model. A blackbox abstract is a form of boundary abstract where no internal timing points are retained. The timing abstract model in the case includes timing arcs only between primary inputs and outputs.

During timing abstraction, timing arcs residing within a predetermined number of logic stages from the primary inputs are considered to be dependent on input waveform shape or slew. In addition, some timing arcs in the fan-out cone of the timing graph where multiple arcs merge may also be considered slew dependent. The delay and output waveform (or slew) of each of these arcs are characterized as a function of input slew. The characterization range may be specified as an absolute range, or a relative range based on slews in the timing graph representation of the macro. In the characterization process for any arc, the timing model returns the delay of the arc and (or) the slew at the sink of the arc as a function of one or more timing quantities (like input slew of that arc as described above). Timing arcs whose delays and output slews are affected by the value of the load at the primary outputs of the macro are considered to be load dependent. The delays and output slews of these arcs are characterized as a function of capacitive load, wherein multiple delays and (or) output slews are obtained for various values of load at the primary output. The characterization range is specified either as an absolute range or as a relative range based on the values of the load at the primary outputs in the macro. Certain timing arcs are considered both input slew and load dependent, an example of which is a timing arc across an inverter with its input connected to a primary input, while its output is attached to a primary output of the macro. The delay and output slew of such arcs are characterized as a function of both input slew and output load. All remaining timing arcs are considered to have a fixed delay and output slew in the abstract corresponding to those values in the macro timing graph. Arcs in the timing graph that denote timing tests may be considered slew dependent for either or both timing points at the ends of the arc depending on the topological location of these timing points. The test guard-times for these arcs are characterized accordingly.

Graph compression may be performed during abstraction. During processing, timing arcs are merged (or combined) to reduce the size and complexity of the abstract model. This obfuscates the internal design details of the macro and is desirable in view of its proprietary considerations when the abstract model is shared among VLSI design vendors. Timing arcs representing gates and interconnects may be combined and the resulting abstract would no longer include all details about existing interconnect segments in the macro.

In Step 504, an arbitrary unmarked primary input i in the macro is selected. Initially, all primary inputs of the macro are considered unmarked. The interconnect network connected to i within the macro is identified in step 505. Subsequently, existing (if any) slew dependent pin capacitances at the sink(s) of the interconnect network are converted to RC network(s). This step is explained hereinafter in more detail with reference to FIG. 6.

Figure 6:
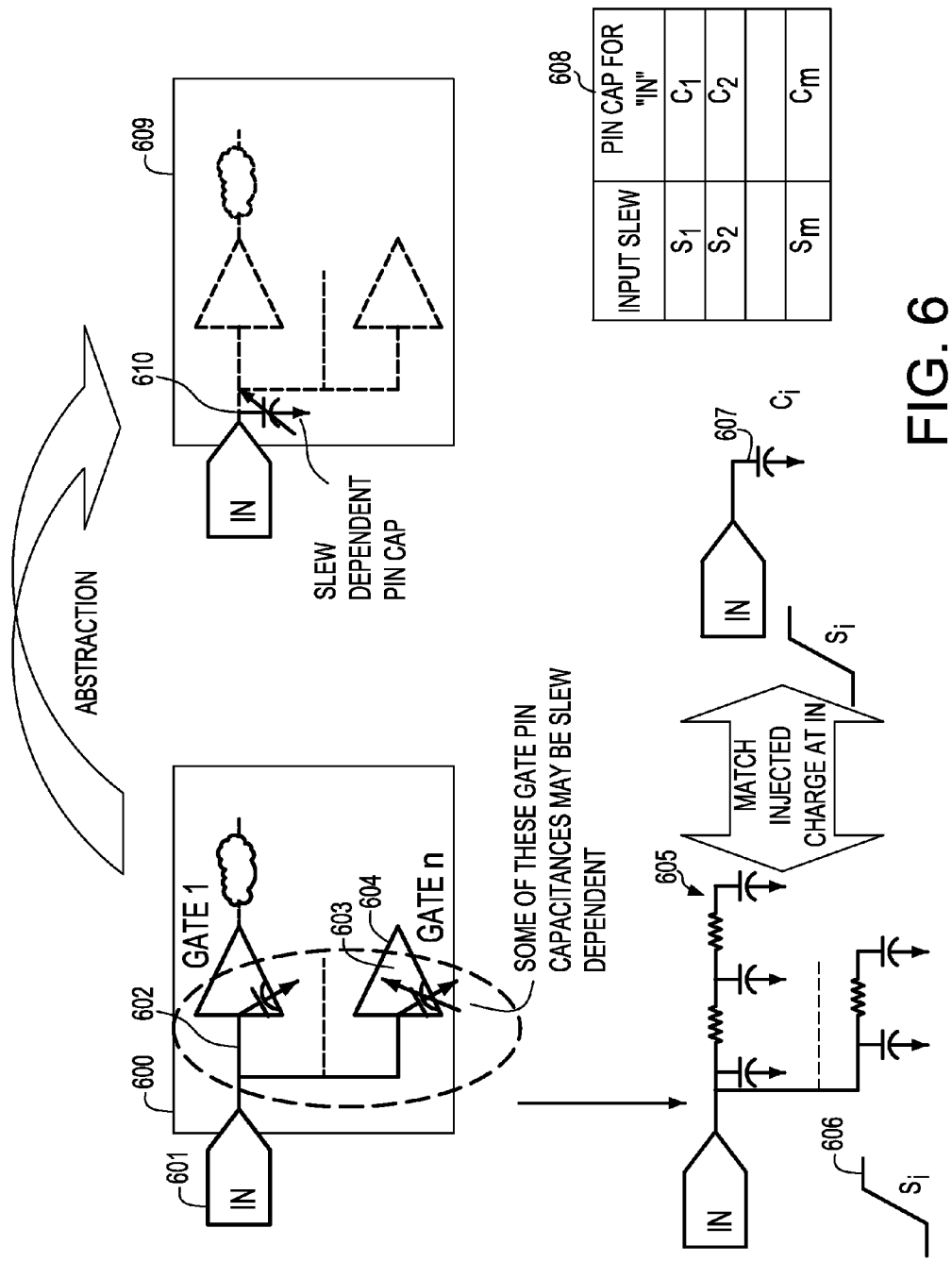
FIG. 6 depicts charge matching steps during abstraction to model primary input pin capacitances of an abstract as slew dependent pin capacitances.

Referring to FIG. 6, macro 600, having a primary input 601, is to be abstracted. The interconnect network attached to the primary input is labeled as 602, and is shown to feed multiple gates within the macro, for example, Gate-1, and Gate-n. Each of these gates has an input pin capacitance. It is possible to have some of the gate pin capacitances to be slew and load dependent, since industry standard gate models like ECSM© and CCS© facilitate such variable capacitances. Gate-n within macro 600 is labeled as 604, and is shown to have a slew (and possibly even a load) dependent pin capacitance 603. In Step 505, each variable pin capacitance like 603 is identified and converted to an RC network. This is achieved using filter synthesis and charge matching, details of which are described by Abbaspour et al. in U.S. patent application Ser. No. 12/043,455. All variable gate input pin capacitances connected to the interconnect network are thereby converted to RC networks.

In step 506, parasitics of the interconnect network connected to primary input i is combined (or stitched) with each of the pin capacitances and/or RC networks obtained after converting slew dependent gate pin capacitances at the sinks of the interconnect network. The combined network now includes only fixed RC or RLC elements, and does not include any slew (and/or load dependent) pin capacitances. For the interconnect example within macro 600, the combined interconnect network is shown as 605.

Charge matching is next performed in step 507 to approximate the obtained combined interconnect RC or RLC network (from step 506) to a set of effective capacitance values corresponding to a set of m voltage waveforms (or slews) at the primary output i. The set of waveforms with slews: $s_1$, $s_2, \ldots, s_j, \ldots, s_m$ may be obtained based on the design (or technology specific) slew limits for the macro.

For a waveform in the set having slew $s_j$, the charge injected into the combined interconnect network is computed when that waveform is asserted at the input of the interconnect network. The injected charge computation may last for the entire duration of the switching waveform, that is, between the time that the waveform is at logic low (or high) and starts switching to the time when the waveform stops switching and reaches a logic high (or low) value. Alternately, the charge computation may be performed within certain voltage threshold points (e.g. 10% to 90%, or 10% to 50% of the voltage swing) of the input waveform.

Assuming that the charge is computed within voltage threshold points x and y relative to the full voltage swing Vdd of the waveform with slew $s_j$, the injected charge $Q_j$ is expressed mathematically as:

$$Q_j = \int_{t: V(t)=x \cdot Vdd}^{t: V(t)=y \cdot Vdd} i_j(t) dt. \qquad \text{(EQ. 1)}$$

In EQ. 1, $i_j(t)$ denotes the instantaneous current fed to the interconnect network at time t and the limits of the integral are between the time the voltage at the input of the interconnect network is x·Vdd to the time the input voltage is y·Vdd. The effective capacitance $C_j$ at the input pin of the interconnect network is then obtained by dividing the injected charge $Q_j$ by the voltage swing between the threshold points x and y. This is expressed mathematically as:

$$C_j = \frac{Q_j}{y \cdot Vdd - x \cdot Vdd} = \frac{\int_{t: V(t)=x \cdot Vdd}^{t: V(t)=y \cdot Vdd} i_j(t) dt}{(y-x) Vdd}. \qquad \text{(EQ. 2)}$$

Conceptually, $C_j$ denotes a capacitance value (shown as 607) that consumes the same amount of charge $Q_j$ as by interconnect network 605 within the time interval when the same voltage waveform with slew $s_j$ switches between the values x·Vdd and y·Vdd.

Given the RC or RLC interconnect network, $Q_j$ may be obtained analytically or computed using processing common interconnect analysis tools such as RICE©. Industry standard gate models like CCS© describe a two-piece slew dependent capacitance, where the former capacitance captures the charge injected before a given CMOS gate switches, while the latter capacitances capture the charge injected after the CMOS gate starts switching. The present invention easily extends to model the interconnect network as an n-piece slew dependent pin capacitance. By way of example, a two-piece slew dependent pin capacitance may be obtained as:

$$C_{j1} = \frac{Q_{j1}}{0.5 \cdot Vdd - x \cdot Vdd} = \frac{\int_{t: V(t)=x \cdot Vdd}^{t: V(t)=0.5 \cdot Vdd} i_j(t) dt}{(0.5-x) Vdd}, \qquad \text{EQ. 3}$$

$$C_{j2} = \frac{Q_{j2}}{y \cdot Vdd - 0.5 \cdot Vdd} = \frac{\int_{t: V(t)=0.5 \cdot Vdd}^{t: V(t)=y \cdot Vdd} i_j(t) dt}{(y-0.5) Vdd}. \qquad \text{(EQ. 4)}$$

The process for obtaining an effective capacitance $C_j$ corresponding to a voltage waveform with slew $s_j$ is repeated m times over the set of input voltage waveforms with slews: $s_1, s_2, \ldots, s_m$ to obtain a set of m effective capacitance values. A tabular form of these obtained values is shown as block 608, and denotes a slew dependent pin capacitance.

The interconnect network may be first reduced to a simpler model using standard model order reduction techniques. Charge matching may alternatively be performed on the reduced model to obtain the primary input slew dependent pin capacitance that facilitates a faster computation at the cost of some loss in accuracy.

Figure 7:
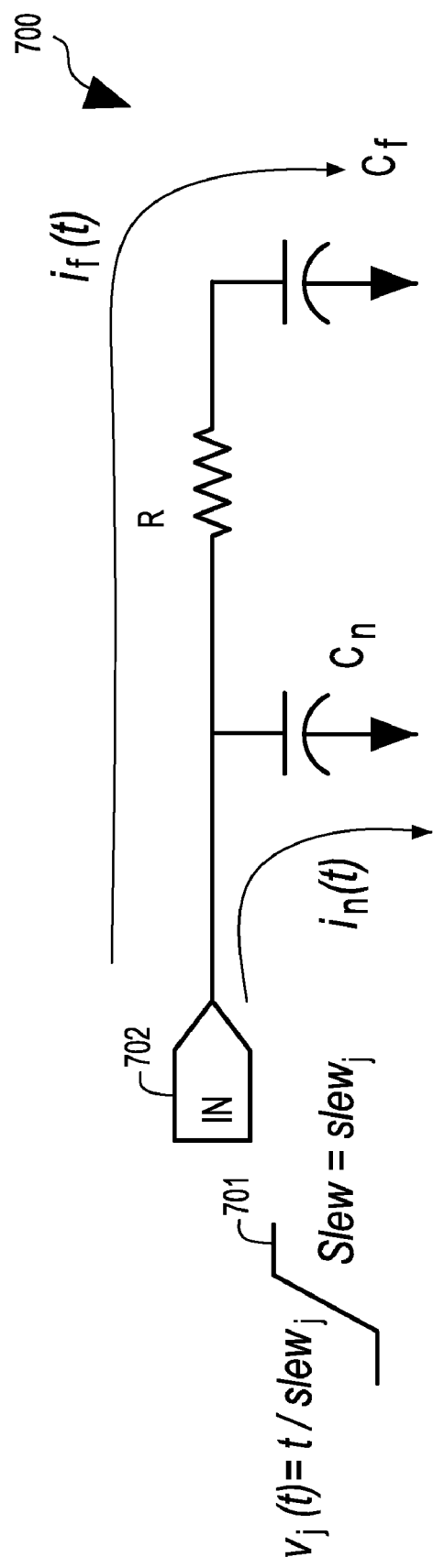
FIG. 7 is an RCπ network with a ramp voltage waveform asserted at its input.

By way of example, and referring to FIG. 7, a slew dependent pin capacitance computation from a reduced RC$\pi$ model of the interconnect network is described as follows. A conventional RC$\pi$ model 700 consists of a near-end capacitance $C_n$, a resistance R, and a far-end capacitance $C_f$. Assuming a ramp voltage waveform 701 with slew $slew_j$ at the input pin 702, the voltage at the input pin during the switching period is expressed as:

$$V_j(t) = \frac{t}{slew_j}. \qquad \text{(EQ. 5)}$$

In the s-domain, this is expressed as:

$$V_j(s) = \frac{1}{slew_j} \cdot \frac{1}{s^2}. \qquad \text{(EQ. 6)}$$

The instantaneous current being fed to the RC$\pi$ network is expressed as:

$$i(s) = i_n(s) + i_f(s) = \frac{1}{slew_j} \cdot \frac{C_n}{s} + \frac{1}{slew_j} \cdot \frac{1}{s^2} \left\{ \frac{sC_f}{1+sRC_f} \right\} \qquad \text{(EQ. 7)}$$

$$= \frac{C_n}{slew_j \cdot s} + \frac{C_f}{slew_j} \left\{ \frac{1}{s} - \frac{1}{s + \frac{1}{RC_f}} \right\}.$$

In the time-domain, this is expressed as:

$$i(t) = i_n(t) + i_f(t) = \frac{C_n}{slew_j} u(t) + \frac{C_f}{slew_j} \left\{ u(t) - e^{-\frac{t}{RC_f}} \right\}. \qquad \text{(EQ. 8)}$$

The charge injected between the time interval corresponding to the x and y relative voltage threshold points due to the current i (t) is obtained by integrating the current as follows (assuming the voltage swing Vdd to be 1):

$$Q_j = \int_{x \cdot slew_j}^{y \cdot slew_j} i(t) dt \qquad (EQ.\ 9)$$

$$= \int_{x \cdot slew_j}^{y \cdot slew_j} \left[ \frac{C_n}{slew_j} u(t) + \frac{C_f}{slew_j} \left\{ u(t) - e^{-\frac{t}{RC_f}} \right\} \right] dt$$

$$\Rightarrow Q_j = C_n(y-x) + C_f(y-x) + \frac{RC_f^2}{slew_j} \left( e^{-\frac{y}{RC_f}} - e^{-\frac{x}{RC_f}} \right). \qquad (EQ.\ 10)$$

The effective capacitance $C_j$ is finally obtained analytically by dividing the charge by the voltage swing between the relative threshold points as follows (once again assuming unit voltage swing Vdd):

$$C_j = \frac{Q_j}{y \cdot Vdd - x \cdot Vdd} \qquad (EQ.\ 11)$$

$$= \frac{Q_j}{y - x}$$

$$= C_n + C_f + \frac{RC_f^2}{slew_j(y-x)} \left( e^{-\frac{y}{RC_f}} - e^{-\frac{x}{RC_f}} \right).$$

The slew dependent pin capacitance value is thus efficiently obtained analytically for different slew values, and tabulated in a manner similar to block 608 in FIG. 6. It is also possible to fit the obtained table to an analytical function that yields the pin capacitance as a function of slew.

In step 508, the slew dependent pin capacitance obtained is captured as the input pin capacitance for primary input i in the abstract. The slew dependent pin capacitance may be stored as a table in industry standard format (e.g. ECSM©). In step 509, the primary input i in the macro (or abstract model) is classified complete to indicate that the corresponding slew dependent input pin capacitance has been obtained.

In step 510, the method checks for any remaining unmarked primary input in the macro (or abstract model). If an unmarked primary input is found, the method restarts the procedure to obtain a slew dependent input pin capacitance for that input, restarting from step 504. Once all primary inputs are marked, the process terminates in step 511.

A filtering operation may be performed during marking of primary inputs that force slew dependent input pin computation only on selected primary inputs instead of all the primary inputs. The filtering may be based on a metric of resistivity of the interconnect network connected to a primary input.

During hierarchical static timing analysis at the chip level, a gate G driving an abstract via a hierarchical interconnect segment (e.g., interconnect segment 402 in FIG. 4), now sees a slew dependent pin capacitance at the primary input of the abstract instead of a lumped capacitance. The gate timing analysis and/or the hierarchical interconnect timing analysis would therefore be iterative. Alternately, the slew dependent pin capacitance observed may be converted back to a RC network as described by Abbaspour et al. in U.S. patent application Ser. No. 12/043,455, of common assignee, and stitched with the parasitics of the hierarchical interconnect segment. This facilitates the combined hierarchical interconnect network seen by the driving gate G to be a closer representation of the true parasitics of the combined hierarchical interconnect network if the original macro was used instead of the abstract model, as previously illustrated with reference to FIG. 4. The current invention thereby solves inaccuracy problems (described above with reference to FIG. 4) during hierarchical chip level STA. Accurate chip level STA helps the chip design procedure by providing improved fidelity during timing analysis and optimization, avoiding chip timing failures that would result in low yields in a VLSI chip manufacturing process.

The method 500 that captures interconnect parasitics as slew dependent pin capacitances during abstraction may also be applied to interconnects that are not connected to the primary inputs. The may be especially beneficial for interconnect networks connected to the primary outputs of the macro by improving the accuracy of STA when the abstract model drives long global (resistive) wires.

It should be noted that although not explicitly specified, one or more steps of the methods described herein may include a storing, displaying and/or outputting step as required for a particular application. Any data, records, fields, and/or intermediate results described in the methods can be stored, displayed, and/or outputted to another device as required for a particular application. Furthermore, steps or blocks in the accompanying figures that recite a determining operation or involve a decision, do not necessarily require that both branches of the determining operation be practiced. In other words, one of the branches of the determining operation can be deemed as an optional step.

Finally, the present invention can be realized in hardware, software, or a combination of hardware and software. The present invention can be realized in a centralized fashion in one computer system or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out the methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

While the present invention has been particularly described in conjunction of a simple illustrative embodiment, it is to be understood that one of ordinary skill in the art can extend and apply the invention in many obvious ways. While the illustrative example shows a small circuit and a small corresponding timing graph, the invention applies to circuits and graphs of any size. In the illustrative example, for purposes of clarity, rising and falling timing quantities were not differentiated, but one of ordinary skill in the art could apply the present invention to a situation with different rising and falling delays, slews, ATs and RATs. The invention applies to any type of static timing, including but not limited to deterministic or statistical static timing of gate-level circuits, transistor-level circuits, hierarchical circuits, circuits with combinational logic, circuits with sequential logic, timing in the presence of coupling noise, timing in the presence of multiple-input switching, timing in the presence of arbitrary timing tests such as setup, hold, end-of-cycle, pulse width, clock gating and loop-cut tests, and timing in the presence of multiple clock domains. It is also to be understood that many alternatives, modifications and variations will be apparent to those skilled in the art in light of the present description. It is therefore contemplated that the appended claims will embrace any such alternatives, modifications and variations as falling within the true scope and spirit of the present invention.

What is claimed is:

1. A method of improving accuracy of an integrated circuit (IC) macro's abstract model by converting parasitics of at least one interconnect network in said macro into a slew dependent pin capacitance, given voltage waveforms corresponding to predetermined slews, the method comprising:
   a) using a computer, determining sink pin capacitances of said interconnect network;
   b) merging said sink pin capacitances with the parasitics of said interconnect network;
   c) determining effective capacitances for said merged parasitics corresponding to said voltage waveforms at a source of the merged interconnect network;
   d) modeling said effective capacitances as a slew dependent pin capacitance associated with said source; and
   e) modifying said abstract model by applying said slew dependent pin capacitance to said abstract model.

2. The method as recited in claim 1, wherein at least one sink pin capacitance is a slew or slew and load dependent pin capacitance.

3. The method as recited in claim 2, wherein the slew dependent or slew and load dependent sink pin capacitance is modeled as an RC network.

4. The method as recited in claim 1, wherein following step b of claim 1, a model order reduction is performed on said merged interconnect parasitics.

5. The method as recited in claim 1, wherein said at least one interconnect network is connected to inputs or outputs of said macro.

6. The method as recited in claim 1, wherein said abstract is modeled as an industry standard gate model.

7. The method as recited in claim 1, wherein said abstract is a complete abstract or a boundary abstract or a blackbox abstract.

8. The method as recited in claim 1, wherein said abstract is a compressed abstract.

9. The method as recited in claim 1, wherein said abstract model replaces one or more occurrences of said IC macro in a hierarchical chip level STA flow.

10. A method of converting parasitics of at least one interconnect network in an IC macro design into a slew dependent pin capacitance, given a set of waveforms corresponding to predetermined slews, the method comprising:
   a) using a computer, determining sink pin capacitances of said interconnect network;
   b) merging said sink pin capacitances with the parasitics of said interconnect network;
   c) determining effective capacitances for said merged parasitics corresponding to said voltage waveforms at a source of the merged interconnect network;
   d) modeling said effective capacitances as a slew dependent pin capacitance associated with said source; and
   e) applying said slew dependent pin capacitance as the parasitics model to said interconnect network in said IC macro design or a model of said IC macro design.

11. A program storage device readable by a machine, tangibly embodying a program of instructions executable by the machine to perform method steps for improving accuracy of an integrated circuit (IC) macro's abstract model by converting parasitics of at least one interconnect network in said macro into a slew dependent pin, said method steps comprising:
   a) using a computer, determining sink pin capacitances of said interconnect network;
   b) merging said sink pin capacitances with the parasitics of said interconnect network;
   c) determining effective capacitances for said merged parasitics corresponding to said voltage waveforms at a source of the merged interconnect network;
   d) modeling said effective capacitances as a slew dependent pin capacitance associated with said source; and
   e) modifying said abstract model by applying said slew dependent pin capacitance to said abstract model.

12. The method as recited in claim 1 wherein timing arcs residing within a number of logic stages from primary inputs in said abstract depend on input waveforms shape or slew.

13. The method as recited in claim 12, wherein said timing arcs in a fan-out cone of a timing graph, wherein multiple arcs merge are slew dependent.

14. The method as recited in claim 12, wherein a delay and output waveform or slew of each of said timing arcs are a function of input slew.

15. The method as recited in claim 14, wherein a characterization range is specified as an absolute range or a relative range based on said slews of a timing graph representation of said macro.

16. The method as recited in claim 14, wherein during said characterization of said timing arc, said timing model returns the delay of the timing arc or the slew at a sink thereof as a function of one or more timings.

17. The method as recited in claim 14, wherein said delays and output slews of said timing arcs are a function of a capacitive load, and wherein multiple delays or said output slews are determined for various values of a load at said primary output.

18. The method as recited in claim 17, wherein said characterization range is specified either as an absolute range or as a relative range based on values of said load at primary outputs of said macro.

19. The method as recited in claim 14, wherein selected timing arcs are input slew and load dependent.

20. The method as recited in claim 19, wherein remaining ones of said timing arcs are assigned a fixed delay value.

21. The method as recited in claim 12, wherein said timing arcs in said timing graph are slew dependent for either or both timing points at ends of said timing arcs.

* * * * *